United States Patent [19]

Newton et al.

[11] Patent Number: 4,776,648
[45] Date of Patent: Oct. 11, 1988

[54] RELAY VALVE ASSEMBLY

[75] Inventors: Ronald O. Newton, Adams; Thomas H. Engle, Cape Vincent, both of N.Y.

[73] Assignee: General Signal Corporation, Stamford, Conn.

[21] Appl. No.: 39,716

[22] Filed: Apr. 20, 1987

[51] Int. Cl.$^4$ .......................... B60T 8/18; B60T 15/02
[52] U.S. Cl. ........................... 303/22.5; 303/2; 303/40
[58] Field of Search ............ 303/2, 22 A, 22 R, 23 A, 303/5, 33, 40, 36, 37, 57, 85; 188/195; 105/215.2

[56] References Cited

U.S. PATENT DOCUMENTS

| | | | |
|---|---|---|---|
| 2,178,928 | 11/1939 | Campbell | 303/2 |
| 2,861,843 | 11/1958 | Bentz et al. | 303/2 |
| 3,125,379 | 3/1964 | Valentine | 303/22 A X |
| 3,136,588 | 6/1964 | McClure | 303/23 R |
| 3,275,380 | 9/1966 | May | 303/40 X |
| 3,730,597 | 5/1973 | Pickert | 303/22 A |
| 4,202,276 | 5/1980 | Browne et al. | 105/165 |
| 4,202,277 | 5/1980 | Browne et al. | 303/2 X |
| 4,387,933 | 6/1983 | Cripe | 303/40 X |
| 4,421,360 | 12/1983 | Newton | 303/22 A |

Primary Examiner—Andres Kashnikow
Assistant Examiner—Timothy Newholm
Attorney, Agent, or Firm—Barnes & Thornburg

[57] ABSTRACT

A relay valve is provided within a single housing and includes a brake cylinder relay valve with combined highway override, a dual pressure brake cylinder limiting valve responsive to load, highway supply line and rail supply line charge check valves and a rail reservoir protection valve. The brake cylinder relay valve includes a valve spool positioned by a first piston responsive to the control signal from a control valve to determine the flow to the brake cylinder and a second piston responsive to the highway supply line to connect the brake cylinder to exhaust. The limiting valve includes a first piston responsive to load signals to define the first set of limits and a second piston in tandem with the first piston responsive to load signals and emergency brake signal in the brake pipe for increasing the response of the first piston to the load signals in response to an emergency signal on the brake pipe.

17 Claims, 3 Drawing Sheets

RELAY VALVE ASSEMBLY

BACKGROUND AND SUMMARY OF THE INVENTION

The present invention relates generally to air brake systems and more specifically for an air brake system and a relay valve to be used in a vehicle convertible between highway and railroad modes of use.

There has always been a great interest in the combined transportation of highway and rail vehicles. This has generally included the loading of road trailers onto flat bed rail cars which are then transported across the rails and then driven to location away from the rails. Efforts have also been made to equip trailers with road wheel and rail wheels such that the trailer itself forms both a road trailer and a rail car. One such vehicle is described in U.S. Pat. Nos. 4,202,276 and 4,202,277 to Browne et al. The major problem with the prior art system, including that of the above-mentioned patents, is that the designers have generally designed a brake system using highway technology and criteria which is unacceptable for use in a rail system.

As an example, the system in the aforementioned patents use a straight air brake system to operate the brake. In this system the pressure and the brake pipe line are used to control a relay valve which in turn controls the brakes. This style of system had been used extensively in rail vehicles but has been replaced by ABD (air brake diaphragm) valves wherein the valve is responsive to modulation of the brake pipe pressure to produce its own brake control signal. A major advantage of the ABD valves is that they provide better control and quicker response as well as the capability of providing braking control for longer length train.

In response to the need for a brake system for a vehicle which is capable of highway and railroad operation with a rail fluid brake system meeting the standards of the rail industry, New York Air Brake Company, a unit of General Signal, developed the brake system illustrated in FIG. 1. Basically it consists of a manifold 28 with a plurality of off-the-shelf elements to operate as a relay valve in combination with an ABDW valve 22 to control the brake cylinder 14. The specific elements and their operation will be described below. Simultaneously with the construction and testing of the manifold relay valve of FIG. 1, New York Air Brake Co. developed the relay assembly in my U.S. Pat. No. 4,421,360. This assembly incorporated the valve functions in a common housing, provided a true variable load proportioning valve as well as other unique features. This system is illustrated in FIG. 2.

The industry has determined that there is a need for a brake system for a vehicle which is capable of highway and railroad operation in between the manifold system of FIG. 1 and the sophisticated relay valve system of FIG. 2.

Thus it is an object of the invention to provide a fluid brake control system for a vehicle which may be used for highway as well a rail travel having capability between the manifold relay valve system of FIG. 1 and the sophisticated relay valve system of FIG. 2.

Still another object of the present invention is to provide a relay valve which performs the function of the two above-described prior art relay valves with fewer parts.

A still even further object of the present invention is to provide a single brake cylinder pressure limiting valve which has two different characteristics, one for service brake application and a second for emergency brake applications.

These and other objects are achieved by providing within a single housing, a brake cylinder relay valve with combined highway override, a dual pressure brake cylinder limiting valve responsive to load, highway supply line and rail supply line charge check valves and a rail reservoir protection valve. This is a substantial reduction in the number of valves of the manifold embodiment of FIG. 1 and is even a reduction in the number of valves of FIG. 2.

The brake cylinder relay valve includes a valve spool whose position determines the flow to the brake cylinder, a first piston connected to the valve spool responsive to the control signal from a control valve and a second piston connected to the spool and responsive to the highway supply line to connect the brake cylinder to exhaust. The first and second pistons are coaxial and work in opposite directions to position the spool. The second piston is connected to the spool via the first piston which is allowed to move freely relative to the second piston in the absence of a highway supply line signal and is drivingly connected in response to a highway supply line signal.

The dual pressure brake cylinder limiting valve limits the brake cylinder pressure in response to the load for a service brake signal within a first set of limits and for an emergency brake signal between a second set of limits which are higher than the first set. The limiting valve includes a first piston responsive to load signals to define the first set of limits and a second piston in tandem with the first piston responsive to load signals and an emergency brake signal in the brake pipe for increasing the response of the first piston to the load signals in response to an emergency signal on the brake pipe.

Other objects, advantages and novel features of the present invention will become apparent from the following detailed description of the invention when considered in conjunction with the accompanying drawings.

DETAILED DESCRIPTION OF THE DRAWINGS

Figure 1:
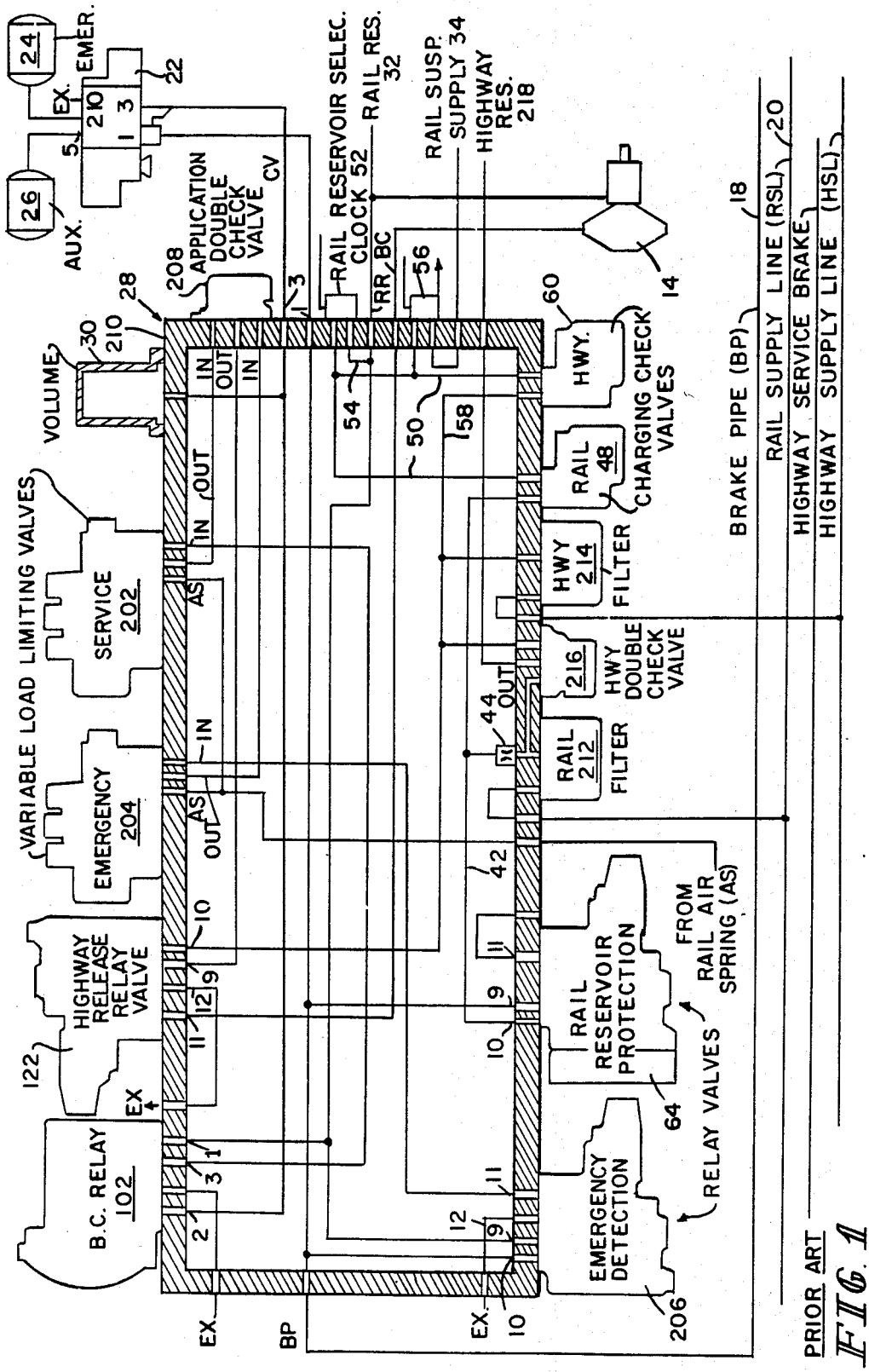
FIG. 1 is a schematic representation of a relay valve manifold for a combined rail and highway system of the prior art.

For sake of clarity, those parts having common functions have the same reference numerals and are those generally used in U.S. Pat. No. 4,421,360 which is incorporated herein by reference.

Referring to FIG. 1, each car includes rail and road wheels as well as rail and road brakes. A brake pipe 18, rail supply line 20, highway service brake and highway supply pipe extend the length of the car with couplings at each end to the preceding and following car.

The fluid brake control system includes a control valve 22 having an emergency reservoir 24 and an auxiliary reservoir 26. Control valve 22 may be an ABDW valve which is responsive to a change in pressure in the brake pipe 18 to provide a proportional output from the auxiliary reservoir 26 as a control signal CV. For an emergency condition or pressure drop in the brake pipe, the control valve 22 provides an emergency control signal CV using both the auxiliary reservoir 26 and the emergency reservoir 24. The operation of the ABDW valve is well known and thus will not be described in detail.

The control signal CV from the control valve 22 is an input or pilot signal to the relay valve assembly 28. A volume 30 is provided such that the combination of the volume 30 and the relay valve assembly 28 which receives a control valve signal in relationship to the auxiliary reservoir 26 and emergency reservoir 24 is proportional to the relationship of a brake cylinder and an auxiliary reservoir and emergency reservoir. It should be noted that the volume 30 may be deleted if sufficient volume is provided in the relay valve assembly 28.

The relay valve assembly 28 includes an input RSL from rail supply line 20 as well as highway supply line HSL. These are used through the relay valve assembly to charge the rail reservoir 32 and the rail suspension supply 34. An air spring (not shown) is charged by the rail suspension supply 34 as is well known. The relay valve assembly 28 maintains the rail reservoir 32 and the rail suspension supply 34 charged by either the rail supply line RSL or the highway supply line HSL using rail charging check valve 48 and high charging check valve 60, respectively.

In normal operation, the relay valve assembly 28 controls the pressure BC to the brake cylinder 14 in response to the control signal CV using fluid from the rail reservoir 32 by brake cylinder relay valve 102. The relay valve assembly 28 is a variable load limiting valve including a load sensor connected to the air spring. This provides a load signal AS. The operation of the relay valve in response to control signal CV is varied using the load signal AS.

In a service application, the output of the brake cylinder relay valve 102 provides an input signal to the service variable load limiting valve 202 which also has an input from the air spring AS. The service limiting valve 202 limits the application of the signal from the brake cylinder relay 102 to the brake cylinder through application double check valve 208 and highway release relay 122.

In an emergency application, the emergency detection relay valve 206 senses an emergency condition on the brake pipe BP and provides an input signal to the emergency variable load limiting valve 204. The output of emergency limiting valve 204 is connected through the application double check valve 208 and highway release relay valve 122 to the brake cylinder port BC. The application double check valve 208 provides the higher of the two signals received from variable load limiting valves 202 and 204 to the highway release relay valve 122.

It should be noted that the variable load limiting valves 202 and 204 are limiting valves in that they limit the maximum signal applied to the wheel from the brake cylinder as a function of the sensed load. Thus above the limits, the signal provided to the brake cylinder is not proportional to the input signal from the brake cylinder relay 102 or the emergency detection valve 206.

The highway release valve 122 is responsive to the presence of a signal on the highway supply line, indicating that the vehicle is to be used on the highway, to disconnect the brake cylinder relay valve 102 and the variable load limiting valves 202 and 204 from the brake cylinder port BC and connect the brake cylinder port BC to exhaust. This deactivates the brake cylinder 14.

For ruptured, disconnected or otherwise inoperable rail supply line 20 or rail reservoir 32, the rail reservoir protection valve 64 connects the brake pipe 18 to exhaust EX so as to create an emergency pressure drop in the brake pipe 18. The emergency detector 206 provides an emergency application through emergency variable load limiting valve 204 to application double check valve 208 and highway release valve 122 to the brake cylinder 14.

As is evident from FIG. 1, all the aforementioned elements are attached to a manifold 210. Also provided on manifold 210 is a rail filter 212, a highway filter 214 and a highway double check valve 216 which charges a highway reservoir 218 from either the highway supply line or the rail supply line.

The improved relay valve of U.S. Pat. No. 4,421,360 is shown in detail in FIG. 2 and reference is made to the subject patent for a detailed explanation of all the elements. The following is a brief review for purposes of comparison with FIG. 1 and the invention of FIG. 3, to be discussed in detail below.

Included in housing 40 are the rail charging check valve 48, highway charging check valve 60, rail reservoir protection valve 64 and highway release valve 122. These operate in the same fashion to achieve the same purpose as those in FIG. 1 although they are incorporated within the body 40 instead of being attached to a manifold 210.

Figure 2:
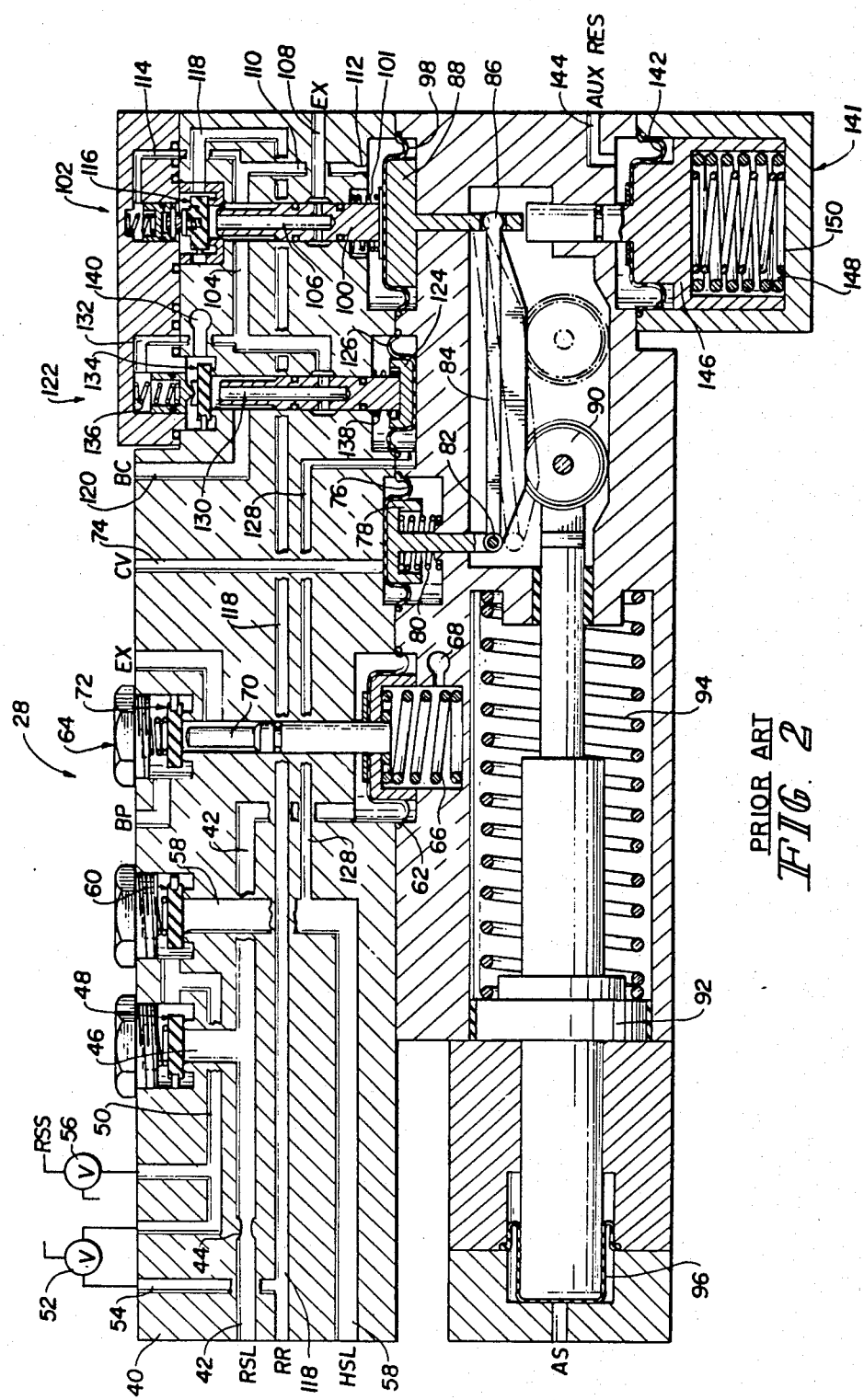
FIG. 2 is a cross sectional representation of a relay valve according to U.S. Pat. No. 4,421,360.

Instead of providing a separate brake cylinder relay valve 102, emergency detection relay valve 206 and separate variable load limiting valves for service and emergency applications 202 and 204, the valve system of FIG. 2 includes a single self lapping spool relay valve 102 for connecting the rail reservoir to the highway release relay valve 122. The control signal CV from the control valve 22 is applied to the spool 100 of the brake relay valve 102, via a lever system having a fulcrum 90 adjusted by the load at load sensing port AS. The roller fulcrum 90 determines the mechanical force relationship and thus the percentage of transfer or the relationship of the control signal CV to the output brake signal BC. Since the control valve 22 is capable of providing a service as well as an emergency control brake signal, lever 84 and variable fulcrum 90 provides a true variable load relay valve and not a variable load limiting relay valve as limiting valves 202 and 204.

Note that the brake cylinder relay valve 102 of FIG. 2 is of similar structure to the brake relay valve 102 of FIG. 1 except that in FIG. 2, the brake control signal CV is applied through the proportional load leverage system to the spool of the relay valve whereas in FIG. 1, the control signal CV is applied directly to the diaphragm which drives the spool.

Figure 3:
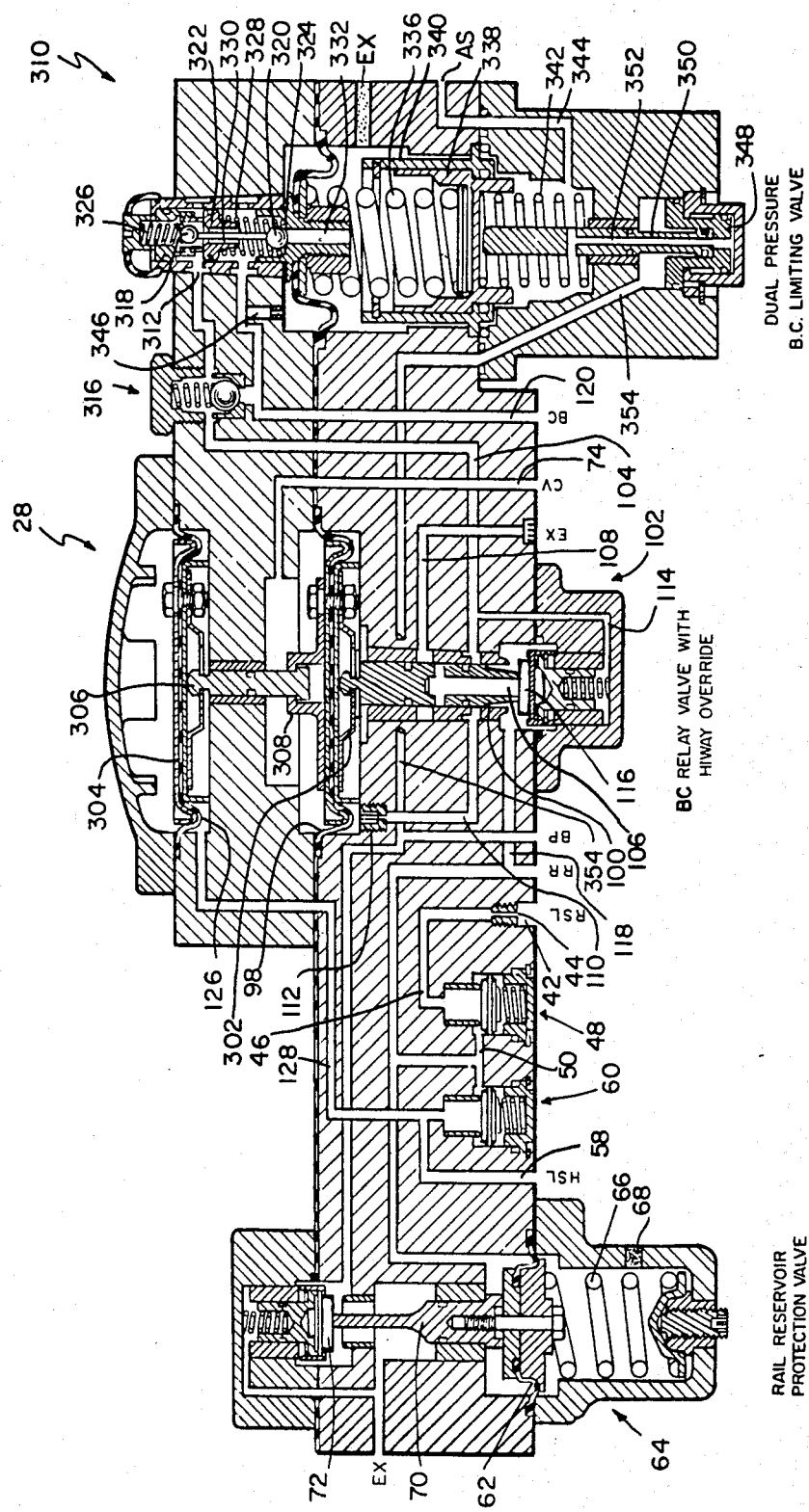
FIG. 3 is a cross sectional representation of the relay valve assembly incorporating the principles of the present invention.

The relay valve of the present invention as illustrated in FIG. 3 is not only an improvement over the manifold system of FIG. 1, but it is also a simpler version of the relay valve of FIG. 2 with the valves incorporated in a housing 300.

In FIGS. 1 and 2 the rail supply line RSL is connected via passage 42 having restriction 44 and passage 46 to a rail charging check valve 48. The output of the check valve 48 is connected via passage 50 and passage 54 to the rail reservoir RR and the rail suspension supply RSS by appropriate valves 52 and 56. The highway supply line HSL is connected via passage 58 to highway charging check valve 60 with the other side being connected to passage 50. Thus, it can be seen that the rail suspension supply RSS and the rail reservoir RR may both be charged either by the rail supply line through check valve 48 or the highway supply line through check valve 60. A leak downstream of check valve 48 that is larger than the flow or maintaining capabilities of restriction 44 will create a pressure drop in passage 42. It can also be seen that a pressure drop in rail supply line can also cause a pressure drop in passage 42.

In FIGS. 1 and 2 passage 42 is connected to the top of diaphragm 62 of rail reservoir protection valve 64. The pressure on the top of diaphragm 62 from passage 42 acts against spring 66 on the bottom of the diaphragm. The space underneath the diaphragm is vented to exhaust via port 68. Piston 70 is connected to the diaphragm 62 and its movement controls check valve 72 which interconnects the brake pipe BP and the exhaust EX. Spring 66 is selected such that when the pressure in passage 50 drops below a predetermined pressure, for example 80 p.s.i., the spring 66 forces the piston 70 against the check valve 72 to connect the brake pipe BP to exhaust EX. This creates an emergency rate of brake pipe pressure reduction that will be sensed by control valve 22, which will in turn react and propagate the emergency rate throughout the train.

It should be noted that the top of diaphragm 62 in the embodiment of FIG. 3 is connected to the rail reservoir port via 118, 54 after the check valves, whereas in the relay valve of FIGS. 1 and 2, the top of diaphragm 62 is connected to the rail supply line RSL port 42 directly. This allows the embodiment of FIG. 3 to be more responsive to the pressure in the rail reservoir since the charging check valve 48 does not have to be open to produce a drop in the rail supply line in order to actuate the rail reservoir protection valve 64.

The control signal CV from the control valve 22 is applied through passage 74 directly to the top of diaphragm 98 of the brake cylinder relay valve 102. This is distinct from the embodiment of FIG. 2 wherein the control signal CV is applied through a variable load leverage system to a piston 88 which provides a force against diaphragm 98.

The diaphragm 98 is connected to the spool 100 of the self lapping spool relay valve 102 by diaphragm follower assembly 302. The output channel 104 from the relay valve 102 is connected to the interior channel 106 of spool 100 when exposed by check valve 116 to exhaust channel 108. Output channel 104 is also connected by passage 110 and restriction 112 to the bottom of diaphragm 98 to counter balance the control signal CV on the top. Passage 114 connects the output of passage 104 of the valve to the bottom of check valve 116 which interconnects the output passage 104 and a fluid passage 118 connected to the rail reservoir RR.

The brake cylinder relay valve 102 includes a highway override section. The highway supply line through passages 58 and 128 is connected to the bottom side of diaphragm 126. A diaphragm follower assembly 304 connects the diaphragm 126 to diaphragm stem 306. Stem follower 308 connects the stem 306 of diaphragm 126 to the follower assembly 302 of the diaphragm 98. The stem 306 has a generally T-shaped cross-section at one end and extends through an aperture in the bight of the generally U-shaped cross-sectional stem follower 308. The relationship between stem 306 and stem follower 308 allows the diaphragm 98 to move up and down relative to the stem 306 to position the spool 100 of the relay valve 102 when there is no highway supply line pressure on the bottom of diaphragm 126.

When the vehicle is to be used in the highway mode, highway supply line HSL is activated and connected to passages 58 and 128 which provides a pressure on the bottom of diaphragm 126. For a preselected pressure, for example, 25 p.s.i., diaphragm stem 306 rises causing the lower side of the head of the T-shaped stem 306 to engage the bight of the stem follower 308. This diaphragm stem 306 drivingly connects through stem follower 30 and pulls diaphragm follower 302 and the spool 100 up causing the check valve 116 to seat. This cuts off the communication between the output 104 of the relay valve 102 and the rail reservoir passage 118. Upon the pressure rising above the predetermined pressure, the plunger continues its upward movement exposing the interior passage 106 of spool 100 thereby interconnecting the output passage 104 to exhaust port 108.

Thus, when the vehicle is connected for highway use as detected by diaphragm 126, the brake cylinder relay spool valve 102 is disabled from controlling the brake cylinder by a control signal CV and the brake cylinder is connected to exhaust thereby deactivating the brake cylinder. This prevents the brake cylinder from operating while in the highway mode. This is important since if the brake cylinder was locked in the highway mode even though the rail wheels are not on the ground, severe damage may occur to the rail wheels if they should hit the ground and not be free to spin.

By combining the highway override with the brake cylinder relay valve, a single spool is operated by the pair of diaphragms. The coaxial motion of the two diaphragms and their combination reduces the number of parts and decreases the amount of space needed within the housing 300.

A dual pressure brake cylinder limiting valve 310 is provided in the housing 300. It includes an inlet 312 connected to outlet passage 104 of the brake cylinder relay valve 102 and an outlet 314 connected to brake cylinder passage 120. A check valve 316 interconnects the outlet passage 104 of the brake cylinder valve 102 and passage 120 of the brake cylinder to bypass the dual pressure brake cylinder limiting valve 310 when the pressure in the brake cylinder is greater than the signal received from the relay valve 102 which occurs during the releases of the BC due to a release action of ABDW valve 22.

A dumb bell having an inlet valve 318 and an exhaust valve 320 interconnected for engagement with the inlet valve seat 322 and the exhaust valve seat 324 respectively. Spring 326 on top of inlet valve 318 biases the inlet and exhaust valves towards their seats. A spring 328 is positioned between the valve seat 322 and 324. Passage 330 in the inlet valve seat 322 connects the inlet 312 with the outlet 314.

Passage 332 in the exhaust valve seat 324 connects the outlet 314 with the underside of the diaphragm 334 which is connected to the exhaust port EX through a filter. A relatively large spring 33 is positioned between the bottom of the diaphragm 334 and a piston 338. The length of travel of piston 338 is limited by bushing 340. A small spring 342 is provided between the housing 300 and the bottom of the piston 338.

A load signal AS from the air spring is provided in passage 344 to the bottom of piston 338. The pressure in the brake cylinder BC and brake cylinder passage 120 is provided to the top of the diaphragm 334 through a restricted passage 346 and operates against the pressure of springs 336, 342 and the load pressure AS from the sensed load signal AS.

Valve 310, in the position shown in FIG. 3, has the inlet valve 318 open providing direct communication between a signal received from the relay valve 102 and the brake cylinder BC. Once a signal is provided by the relay valve, the pressure in the brake cylinder passage 120 begins to build up as it does in the brake cylinder and provide pressure on the top of diaphragm 334 through the restrictive passage 346. Once the pressure above the diaphragm 334 exceed the initial biasing of springs 336, 342 and the load signal AS, exhaust valve seat 324 begins to lower. The spring 326 is strong enough to maintain the exhaust valve 320 closed on seat 324 and move the dumb bell down.

The downward motion of the dumb bell continues until the inlet valve 318 seats on inlet valve seat 322 cutting off the communication from the relay valve 102.

The exact pressure at which the inlet valve 318 seats is a function of the spring constants of springs 336 and 342 and the load signal AS. As the load signal increases, the pressure provided on the bottom of piston 338 raises the piston to compress spring 336. As will be noted, the length of travel of piston 338 is relatively short and therefore it will stop relatively quickly to define a relatively short period in which the valve is variably responsive to the load.

If the pressure in the brake cylinder should exceed limiting pressure valve defined by springs 336, 342 and the load signal AS, the exhaust valve seat 324 will continue downward unseating the exhaust valve 320 and connecting the brake cylinder through passage 334 to the exhaust. When sufficient brake cylinder pressure has been exhausted, the exhaust valve seat 324 will rise and come into contact with the exhaust valve 320.

The portions of the limiting valve 310 including check valve 316 so far described, including their operation, is the same as that of the variable load limiting valves 202 of FIG. 1.

The limiting valve 310 is a dual pressure brake cylinder limiting valve which incorporates an emergency limiting section operating on the same valve elements. The emergency section includes a piston 348 having a valve stem 350 which lies spaced and adjacent to the piston 338. Channel 352 through the valve stem 350 and piston 348 connects the sensed load signal AS from passage 344 to the bottom of piston 348. Passage 354 connected to the brake pipe port BP communicates brake pipe pressure to the top of piston 348.

The brake system maintains the brake pipe pressurized and transmits service braking by decreasing the pressure while providing an emergency braking by substantially totally depleting the brake pipe of any fluid pressure. Under normal fully pressured and service braking, the pressure from the brake pipe on the top of emergency piston 348 is sufficient to maintain the stem 350 such that the load pressure signal AS operates only on the bottom surface area of piston 338. When an emergency condition exists and the brake pipe pressure drops on the top of piston 348, the piston 348 rises bringing stem 350 into engagement with the bottom of piston 338.

Thus, the effective area that the load signal AS operates on is the sum of the bottom surface of piston 338 minus the diameter of the stem 350 plus the bottom surface area of piston 348. This is an increase of approximately 20 percent. This increase is the biasing force on the bottom of the diaphragm 334 and allows the brake cylinder pressure to be increased as a function of load, thus increasing the limit of the limiting valve 310. As can be noted from the drawing, the top surface of the piston 348, which is exposed to the brake pipe pressure is larger than the other surface which is exposed to the load signal AS.

With respect to the relay system of FIG. 1, the limiting valve 310 takes the place of limiting valves 202 and 204, application double check 208 and emergency detection valve 206. With respect to FIG. 2, the relay valve of FIG. 2 is a continuously variable load valve and not a limiting valve and therefore, there is no limit which must be increased for an emergency braking.

The load signal AS may vary anywhere from 16 p.s.i. empty, to 95 p.s.i. full. The springs 336 and 342 and the area of the elements of limiting valve 310 are designed such that 100 percent of the inlet pressure on inlet 312 is provided to the brake cylinder for a full load and decreasing to approximately 18 percent for a the empty load in a service application. For an emergency application where the pressure level is 20 percent higher from the ABDW, 100 percent of the inlet pressure 312 is provided for a full load and decreasing to 18 percent for the empty load condition. These are just one operating example.

The variable load limiting valves 202 and 204 used on the manifold assembly 28 on FIG. 1 provide the same limits and pressures during service and emergency brake application as the dual pressure limiting valve 310 of FIG. 2 because the spring constants and area relationship are the same during these operating conditions.

In the preceding description of the preferred embodiment, it is evident that the objects of the invention are attained in that a fluid control brake system for a vehicle which is capable of highway and rail use is provided with many necessary features and compatibility with rail systems. Although the invention has been described in detail, it is evident that this is by way of illustration and example only and is not to be taken by way of limitation. Although the brake control system as illustrated in FIG. 1 shows many distinct elements, the relay valve assembly of FIG. 3 is an integrated unit and may be mounted to the face of a control valve 22 thereby eliminating extended interconnections. Although the relay valve assembly was designed for the rail brake system of a vehicle having rail and highway modes, certain features of the valve assembly are unique and distinct within themselves and may be used on any rail brake system. Thus, the spirit and scope of the present invention are to be limited only by the terms of the appended claims.

What is claimed:

1. A relay valve for use in a brake system having rail and road brake systems including control valve means responsive to brake signals in a rail brake control pipe for providing control signals to a rail brake cylinder, means for providing a sensed load signal, a rail supply line and highway supply line to be charged during rail and highway use respectively, said relay valve comprising:

control, brake cylinder, rail supply, highway supply, load and exhaust ports;

first valve means responsive to signals on said control port for governing the flow of fluid from said rail supply port to said brake cylinder port and responsive to the presence of a predetermined pressure on said highway supply port for maintaining said brake cylinder deactivated; and second valve means connected between said brake cylinder port and said first valve means and responsive to signals on said load port for limiting the effect of the signal from said first valve means as a function of said signals on said load port.

2. A relay valve according to claim 1, including a rail reservoir port, first check valve means for controlling flow from said highway supply port to said rail reservoir port, and second check valve means for controlling flow from said rail supply port to said rail reservoir port.

3. A relay valve according to claim 2, including a brake control pipe port and a third valve means for connecting said exhaust port to said brake control pipe port in response to a predetermined low pressure on said rail reservoir port.

4. A relay valve for use in a brake system having rail and road brake systems including control valve means responsive to brake signals in a rail brake control pipe for providing control signals to a rail brake cylinder, means for providing a sensed load signal, a rail supply line and highway supply line to be charged during rail and highway use respectively, said relay valve comprising:

control, brake cylinder, rail supply, highway supply, load and exhaust ports;

first valve means responsive to signals on said control port for governing the flow of fluid from said rail supply port to said brake cylinder port and responsive to the presence of a predetermined pressure on said highway supply port for maintaining said brake cylinder deactivated;

second valve means connected between said brake cylinder port and said first valve means and responsive to signals on said load port for limiting the effect of the signal from said first valve means as a function of said signals on said load port; and wherein said first valve means includes:

a valve spool whose position determines flow connections of said first valve means;

first piston means connected to said valve spool and responsive to signals on said control port for positioning said valve spool to govern the flow of fluid from said rail supply port to said brake cylinder port; and second piston means connected to said valve spool and responsive to signals on said highway supply port for positioning said valve spool to connect said exhaust port with said brake cylinder port.

5. A relay valve according to claim 4, wherein said first piston means includes means for connecting said control port to one side of said first piston means and means for connecting said brake cylinder port to a side of said first piston means opposite said first side.

6. A relay valve according to claim 4, wherein said first and second piston means are coaxial and move said valve spool in opposite directions in response to signals on said control port and highway supply port respectively.

7. A relay valve according to claim 4, wherein said first piston means is connected between said valve spool and said second piston means.

8. A relay valve according to claim 4, including means connecting said second piston means to said first piston means for allowing said first piston means to move relative to said second piston means to position said valve spool in response to signals on said control port and in the absence of signals on said highway supply port and for drivingly connecting said first and second pistons to move said first and second pistons means to position said valve spool in response to signals on said highway supply port.

9. A relay valve according to claim 8, wherein said first and second piston means are coaxial and move said valve spool in opposite directions in response to signals on said control port and highway supply port respectively.

10. A relay valve for use in a brake system having rail and road brake systems including control valve means responsive to brake signals in a rail brake control pipe for providing control signals to a rail brake cylinder, means for providing a sensed load signal, a rail supply line and highway supply line to be charged during rail and highway use respectively, said relay valve comprising:

control, brake cylinder, rail supply, highway supply, load, brake control pipe and exhaust ports;

first valve means responsive to signals on said control port for governing the flow of fluid from said rail supply port to said brake cylinder port and responsive to the presence of a predetermined pressure on said highway supply port for maintaining said brake cylinder deactivated;

second valve means connected between said brake cylinder port and said first valve means and responsive to signals on said load port for limiting the effect of the signal from said first valve as a function of said signals on said load port; and said second valve means including emergency means for changing the limiting effect of said second valve means as a function of signals on said load port in response to an emergency signal on said brake control pipe port.

11. A relay valve according to claim 10, wherein said second valve means includes a first piston means responsive to signals on said load port to define a first limiting effect and said emergency means includes a second piston means in tandem with said first piston means and responsive to signals on said load port and said brake control pipe port for increasing the response of said first piston to signals on said load port in response to said emergency signal.

12. A relay valve according to claim 11, wherein said first and second pistons means are coaxial.

13. A relay valve according to claim 11 wherein said second piston means includes means for connecting said load port to one side of said second piston means and means for connecting said brake control pipe port to a side of said second piston means opposite said first side.

14. A relay valve for use in a brake system having rail and road brake systems including control valve means responsive to brake signal in a brake control pipe for providing control signals to a rail brake cylinder, a rail supply line and highway supply line to be charged during rail and highway use respectively, said relay valve comprising:

control, brake cylinder, rail supply, highway supply, and exhaust ports;

a valve spool whose position determines flow connections of said relay valve;

first piston means connected to said valve spool and responsive to signals on said control port for positioning said valve spool to govern the flow of fluid from said rail supply port to said brake cylinder port;

second piston means connected to said valve spool and responsive to signals on said highway supply port for positioning said valve spool to connect said exhaust port with said brake cylinder port; and said first piston means being connected between said valve spool and said second piston means.

15. A relay valve according to claim 14, wherein said first and second piston means are coaxial and move said valve spool in opposite directions in response to signals on said control port and highway supply port respectively.

16. A relay valve for use in a brake system having rail and road brake systems including control valve means responsive to brake signal in a brake control pipe for providing control signals to a rail brake cylinder, a rail supply line and highway supply line to be charged during rail and highway use respectively, said relay valve comprising:

control, brake cylinder, rail supply, highway supply, and exhaust ports;

a valve spool whose position determines flow connections of said relay valve;

first piston means connected to said valve spool and responsive to signals on said control port for positioning said valve spool to govern the flow of fluid from said rail supply port to said brake cylinder port;

second piston means connected to said valve spool and responsive to signals on said highway supply port for positioning said valve spool to connect said exhaust port with said brake cylinder port; and means connecting said second piston means to said first piston means for allowing said first piston means to move relative to said second piston means to position said valve spool in response to signals on said control port and in the absence of signals on said highway supply port and for drivingly connecting said first and second pistons to move said first and second pistons means to position said valve spool in response to signals on said highway supply port.

17. A relay valve according to claim 16, wherein said first and second piston means are coaxial and move said valve spool in opposite directions in response to signals on said control port and highway supply port respectively.

* * * * *